Figure 1:
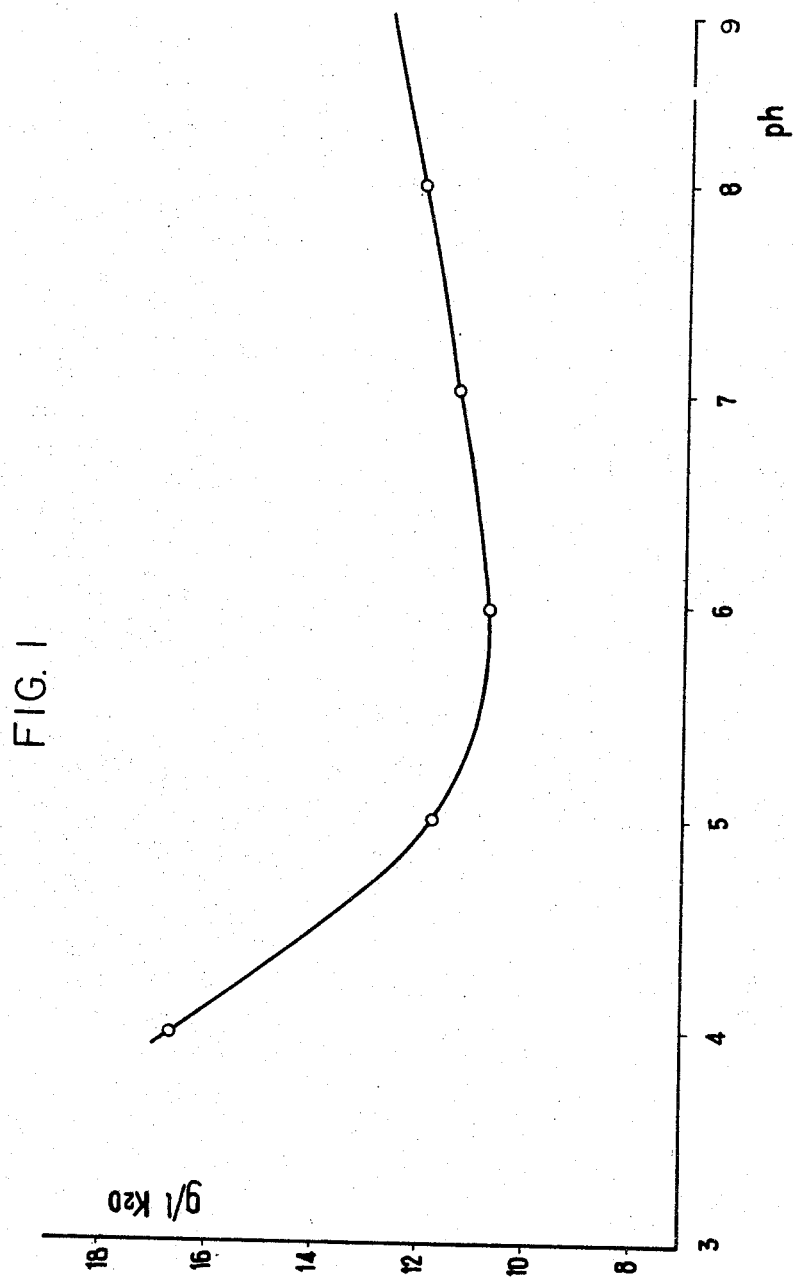

FIG. I

United States Patent Office 3,345,142
Patented Oct. 3, 1967

3,345,142
SELECTIVE DISSOLUTION OF SODIUM CHLORIDE FROM KAINITE MINERALS WITH WATER CONTAINING ADDED SURFACE ACTIVE AGENTS
Gerlando Marullo, Palermo, and Giovanni Perri and Giuseppe Tubiello, Novara, Italy, assignors to Montecatini Edison S.p.A., Milan, Italy
Filed Sept. 16, 1964, Ser. No. 396,951
Claims priority, application Italy, Sept. 18, 1963, 19,058/63
3 Claims. (Cl. 23—312)

Aqueous leaching is one of the most interesting physical processes used to enrich with $K_2O$ the kainite minerals containing sodium chloride as an impurity, because of its extreme simplicity and low operating cost. This process, as is known, is based on the higher solution rate of sodium chloride in water, with respect of kainite. By subjecting a natural or artifical mixture of kainite and sodium chloride to aqueous leaching, a leaching water having a high NaCl content, and a solid fraction enriched with $K_2O$ are obtained. For instance, in U.S. Patent 2,862,788, kainite impure with sodium chloride, is leached for less than 2 minutes with 25–30% of water.

In general, the selective dissolution requires operating within narrow limits determined by the various parameters which regulate the phenomenon and, therefore, this method is rather delicate and exposed to deleterious variations in the yields.

An object of this invention is to overcome these disadvantages. The applicants have found that better and constant yields can be obtained if the aqueous leaching is carried out in the presence of particular surface-active substances.

These compounds protect the kainite surface from the action of water during the very short period of time in which the washing is carried out. This phenomenon is similar to that occurring with the flotation reactants which render hydrophobic the surface of minerals.

In the aqueous leaching of kainite, the protective action is exerted only by those surface-active compounds which have the chemical structure represented by the following formulas:

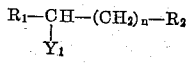

II         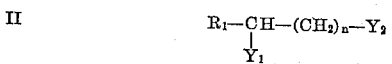

wherein $R_1$ and $R_2$ are alkyl radicals, equal or different; $Y_1$ and $Y_2$ are hydrophilic groups such as —OH, —COOH, —$SO_3H$, —$SO_4H$, —$NH_2$ and can be equal or different; $n$ is an integer and can be zero. These compounds have a total number of carbon atoms from 6 to 30, preferably from 8 to 22.

The compounds can be represented also by the formula:

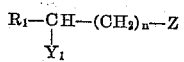

where Z can be $R_2$ or $Y_2$.

Some surface-active groups of the indicated type which have the protective action according to the invention follow for each group. Compounds of type I are, for example:

(a) The derivatives of 8-hexadecene

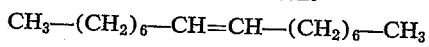

containing a hydrophilic group, such as sodium 8-hexadecylsulfate

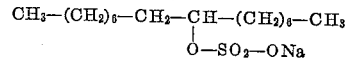

In general, olefins containing an inner double bond, by sulfatation give the compounds of type I. The preparation of these compounds is described in "Surface-Active Agents," A. M. Schwartz, J. W. Perry, New York, Interscience Publ. (1949), pages 66–69.

(b) The sulfuric ester of decan-6-ol or 6-decylsulfate

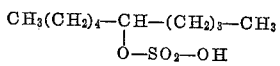

Decyl alcohol

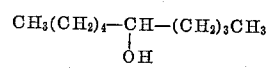

is obtained, for example, from primary hexyl aldehyde and butyl iodide (Grignard reaction); the successive sulfatation with chlorosulphonic acid leads to the sulfuric ester (Ind. Eng. Chem., 1940, pp. 206–207).

Compounds of type II are easily obtained from natural unsaturated fats; a hydrophilic group can be attached at the inner double bond of unsaturated acids according to a known technique. Examples of compounds of type II are:

(a) 9-sulfate of 1-octadecanoic acid, namely 9-sulfate of stearic acid, obtained from oleic acids $$CH_3—(CH_2)_7CH=CH(CH_2)_7COOH$$

by sulfatation:

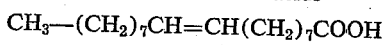

(b) 9-hydroxystearic acid:

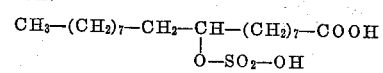

(c) 9-aminostearic acid:

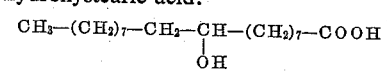

(d) 9-sulfate of 1-octadecanol, obtained from oleic alcohol $CH_3$—$(CH_2)_7$—$CH=CH$—$(CH_2)_7CH_2OH$ by sulfatation:

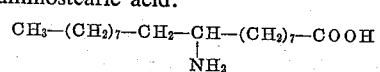

(e) alpha-sulfostearic acid or 2-sulfostearic acid

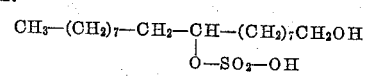

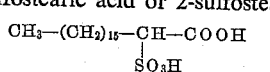

All the aforementioned compounds have the maximum protective activity in a pH range between 5 and 9.

Figure 2:
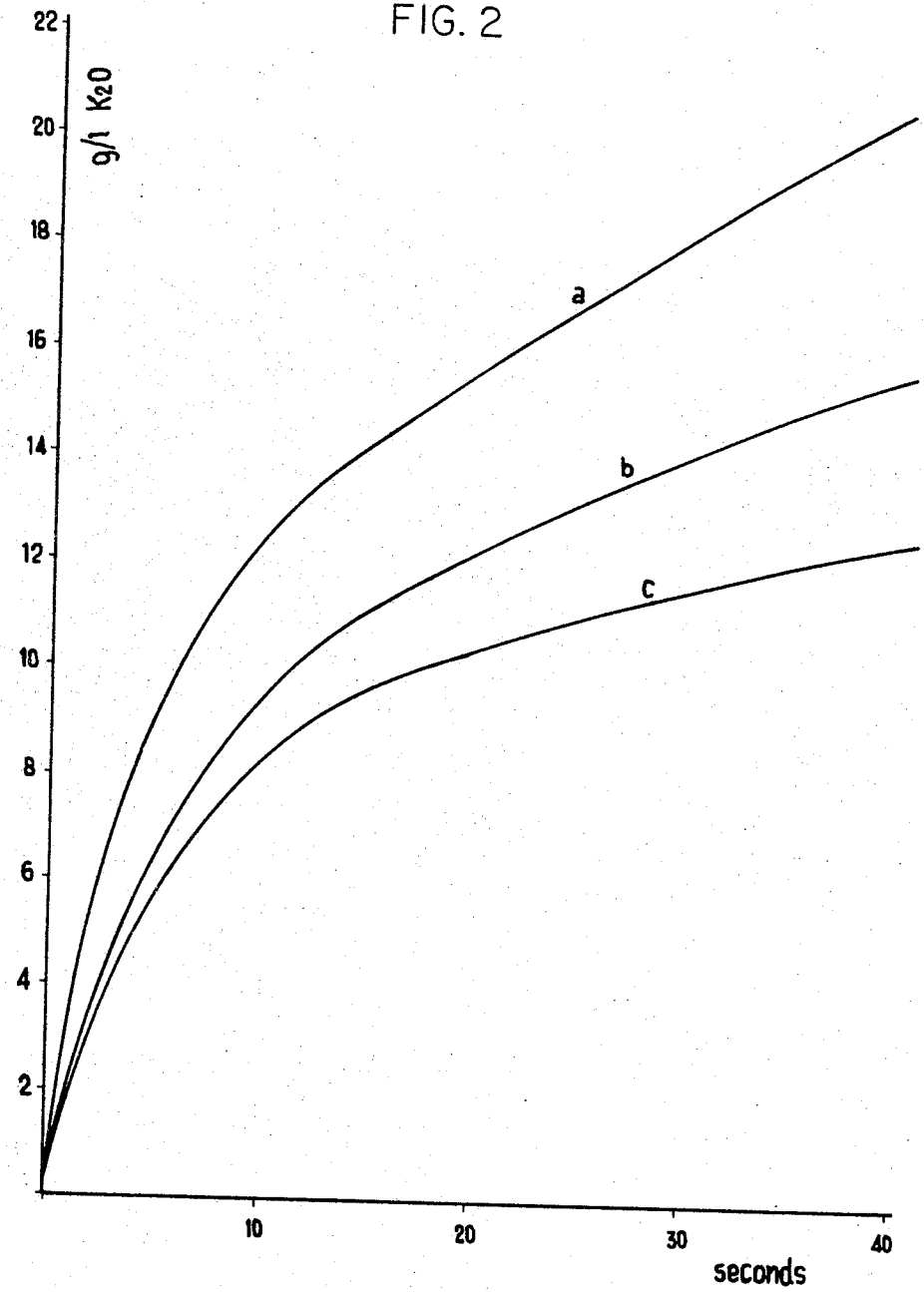

In the drawings:

FIG. 1 shows the pH of the washing solution on the abscissa and the $K_2O$ dissolved in the washing solution on the ordinate for sulfates and sulfonates; and FIG. 2 shows the dissolution time on the abscissa and the $K_2O$ content in g./l. of the leaching water on the ordinate for various reagents.

The tests shown in FIG. 1 were carried out under the following conditions:

(a) Kainite mineral containing 13% of $K_2O$, ground to a granulometry between 2 and 0.2 mm.
(b) Washing ratio: 0.75 part of water to 1 part of mineral
(c) Washing time: 35 seconds
(d) Washing temperature: 20° C.

(e) Surface-active agent added: 9-sulfostearic acid, added to the washing water in the amount of 300 g. per ton of raw mineral, corresponding to a concentration in the aqueous solution of 0.4 g./l.

In general, the optimum amount of surface-active agent to be used depends on the type of raw mineral available. Amounts in the order of 200–500 g./ton, referred to raw mineral, are sufficient to obtain an average improvement in the yield of 5–8% of $K_2O$. These yields can be further improved by increasing the amount of surface-active agent up to the limit of the economical convenience that can be determined only in each case.

*Example 1*

This example is with respect to FIG. 2 which shows the dissolution behavior of kainite in water in the presence of some of the aforementioned surface-active compounds. In FIG. 2, the dissolution time is reported on the abscissa and the $K_2O$ content, expressed in g./l., of the leaching water during washing is reported on the ordinate. The data relating to the various curves were obtained in dissolution tests carried out under the same conditions (leaching ratio of 0.7 part of water per 1 part of kainite; temperature 20° C.) and with the same kainite material (granulometry: 0–2 mm.; $K_2O$ content 13.5%). Curve *a* relates to the leaching only with water, curve *b* to the leaching with water containing 0.5 g./l. of the sodium salt of the 9-sulfostearic acid. Curve *c* relates to the leaching with water containing 0.5 g./l. of sodium 8-hexadecyl-sulfate.

*Example 2*

Table I hereinbelow shows the results of some aqueous leachings carried out in the presence and in the absence of protective agents. All the tests were carried out under the following conditions:

(a) Kainite material, with a $K_2O$ content of 13%, ground to a granulometry between 0 and 2 mm.
(b) Washing ratio:
   Mineral _____ g__ 1,000
   Water _____ cc__ 750
(c) Washing time: 35 seconds.
(d) Washing temperature: 20° C.

The kainite material was suspended in water and kept in agitation for the established time. The products were filtered and analyzed. The washing ratio and time were selected so as to obtain a kainite solid residue containing 16.5% of $K_2O$ and 4% of Na (wet products). In the tests carried out in the presence of protective agents, the latter were previously added to the washing water.

TABLE I

[Aqueous leaching of kainite mineral in the presence of surface-active agents]

| Reagent added | | Composition of the brine after washing | | Yield in $K_2O$ percent | Formula of the reagent |
|---|---|---|---|---|---|
| Chemical composition | Quantity, g./ton | $K_2O$, g./l. | Na g./l. | | |
| 8-hexadecylsulfate | 300 | 10.55 | 99.5 | 93.5 | $CH_3-(CH_2)_6-CH_2-\underset{\underset{SO_2-OH}{\mid}{O}}{CH}-(CH_2)_6-CH_3$ |
| Octadecan-1-ol-9-sulfate | 300 | 9.75 | 101.7 | 94 | $CH_3-(CH_2)_7-CH_2-\underset{\underset{SO_2-OH}{\mid}{O}}{CH}-(CH_2)_7-CH_2-OH$ |
| 9-Sulfostearic acid | 300 | 9.25 | 103.5 | 94.3 | $CH_3-(CH_2)_8-\underset{\underset{SO_3H}{\mid}}{CH}-(CH_2)_7-COOH$ |
| 8-Hydroxystearic acid | 500 | 13.75 | 98.5 | 91.5 | $CH_3-(CH_2)_6-\underset{\underset{OH}{\mid}}{CH}-(CH_2)_9-COOH$ |
| No reagent | | 17.85 | 97.5 | 89.0 | |

Obviously many modifications and variations of the present invention are possible in the light of the above teachings. It is therefore to be understood that within the scope of the appended claims, the invention may be practiced otherwise than specifically described.

We claim:
1. A process for the purification of kainite from sodium chloride by washing with water, which comprises adding to the washing water a surface-active agent of the formula

$$R_1-\underset{\underset{Y_1}{\mid}}{CH}-(CH_2)_n-Z$$

wherein Z is selected from the group consisting of $R_2$ and $Y_2$; $R_1$ and $R_2$ are alkyl groups; $Y_1$ and $Y_2$ are hydrophilic groups selected from the group consisting of —OH, —COOH, —SO$_3$H, —SO$_4$H, —NH$_2$; and *n* is an integer which can be zero; the compound being from 6 to 30 carbon atoms; and preferentially leaching the sodium chloride from the kainite with said wash water.

2. The process of claim 1, wherein the surface-active agent is from 8 to 22 carbon atoms.

3. A process according to claim 1, characterized in that the surface-active agent is used in the amount of 200–500 grams per ton of mineral and the washing is at a pH between 5 and 9.

References Cited

UNITED STATES PATENTS

| | | | |
|---|---|---|---|
| 2,211,397 | 8/1940 | Weinig | 23—31 X |
| 2,222,330 | 11/1940 | Weinig | 23—312 X |
| 2,336,854 | 12/1943 | Ferris | 23—312 X |
| 2,382,360 | 8/1945 | Weiner | 23—312 X |
| 2,766,885 | 10/1956 | Marullo | 23—39 X |
| 2,895,794 | 7/1959 | Dancy | 23—38 |
| 3,199,948 | 8/1965 | Scarfi | 23—38 |

FOREIGN PATENTS 482,579    3/1938    Great Britain.

NORMAN YUDKOFF, *Primary Examiner.*

S. J. EMERY, *Assistant Examiner.*